(12) United States Patent
Minkkinen

(10) Patent No.: US 8,242,752 B2
(45) Date of Patent: Aug. 14, 2012

(54) METHOD AND ARRANGEMENT FOR CONTROLLING AN ELECTRICAL DEVICE

(75) Inventor: Jarmo Minkkinen, Pertteli (FI)

(73) Assignee: Salcomp Oyj, Salo (FI)

( * ) Notice: Subject to any disclaimer, the term of this patent is extended or adjusted under 35 U.S.C. 154(b) by 893 days.

(21) Appl. No.: 12/313,666

(22) Filed: Nov. 20, 2008

(65) Prior Publication Data

US 2009/0128099 A1  May 21, 2009

(30) Foreign Application Priority Data

Nov. 27, 2007  (FI) ..................................... 20070909

(51) Int. Cl.
*H02J 7/04* (2006.01)
*H02J 7/16* (2006.01)

(52) U.S. Cl. .......................................... 320/165; 710/17

(58) Field of Classification Search .................. 320/165; 710/17

See application file for complete search history.

(56) References Cited

U.S. PATENT DOCUMENTS

| 6,339,314 B1 | 1/2002 | Bruning |
| 7,268,561 B2 * | 9/2007 | Zhu ............................... 324/538 |
| 7,359,995 B2 * | 4/2008 | Su et al. ........................... 710/15 |
| 7,644,217 B2 * | 1/2010 | Butler et al. ................... 710/302 |
| 2006/0075152 A1 | 4/2006 | Zhu |

FOREIGN PATENT DOCUMENTS

JP          6309071          11/1994

* cited by examiner

*Primary Examiner* — Ramy Ramadan
(74) *Attorney, Agent, or Firm* — Ware, Fressola, Van Der Sluys & Adolphson LLP

(57) ABSTRACT

The invention relates to a method and arrangement for detecting a situation in which an electrical device is connected to another electrical device. The electrical device comprises a first, second, and third electrical contact terminal (101, 102, 103). Non-zero voltage is arranged between the second and third electrical contact terminal. The other electrical device comprises counterparts (104, 105, 106) for the first, second, and third electrical contact terminal. There is a galvanic coupling (107) between the counterparts for the first and second electrical contact terminal. The arrangement comprises a resistor (108) between the first and second electrical contact terminal and a detector (112) for detecting the situation in which the electrical device is connected to the other electrical device on the basis of a change of an electrical quantity associated with the resistor. The first electrical contact terminal can be e.g. a metal shield on a USB-connector.

19 Claims, 4 Drawing Sheets

METHOD AND ARRANGEMENT FOR CONTROLLING AN ELECTRICAL DEVICE

CROSS REFERENCE TO RELATED APPLICATION

This application claims priority under 35 USC §119 to Finnish Patent Application No. 20070909 filed on Nov. 27, 2007.

FIELD OF THE INVENTION

The invention relates to a method and arrangement for detecting a situation in which an electrical device is connected to another electrical device. The invention relates also to an electrical device capable of detecting a situation in which the electrical device is connected to another electrical device.

BACKGROUND OF THE INVENTION

Many electrical devices are designed to operate in conjunction with other electrical devices. For example, a charger device is designed to supply a specified voltage and/or electrical current to a battery operated electrical device in order to charge batteries of the battery operated electrical device. The battery operated electrical device can be, for example, a mobile phone or a palmtop computer. As another example, a data collecting and analysing device is designed to collect data from another electrical device when the data collecting and analysing device is connected to the other electrical device. The other electrical device can be, for example, an electronic control system of an engine of a car. An electrical device of the kind described above shall start to operate in a desired way as a response to a situation in which the electrical device is connected to another electrical device.

In a solution according to the prior art, an electrical device is kept in a full state of readiness when the electrical device is energized but the electrical device is not connected to another electrical device. For example, an output voltage of a charger device is kept in its specified value also when no other electrical device is connected to the charger device. For example, in charger devices for mobile phones there is typically a 100-300 mW power loss in a situation in which a charger device is connected to a power grid but it is not connected to a mobile phone. Therefore, keeping an electrical device in a full state of readiness may cause undesirable waste of energy. In charger devices comprising a switched mode power supply the above-mentioned power loss can be decreased to some extent by reducing a switching frequency of the switched mode power supply when the charger device is not loaded.

In another solution according to the prior art, an electrical device is equipped with a switch or with some other control means with the aid of which a user of the electrical device can switch the electrical device into an active operating mode e.g. after connecting the electrical device to another electrical device. The need to operate a switch or other control means makes, however, the usage of the electrical device more cumbersome and inconvenient. Furthermore, a risk for erroneous use is increased.

In light of the above-presented, there is a need for technical solutions that can be used for detecting a situation in which an electrical device that may be set in a low power state is connected to another electrical device.

SUMMARY OF THE INVENTION

In accordance with a first aspect of the invention a novel arrangement for detecting a situation in which a first electrical device is connected to a second electrical device is provided. The first electrical device comprises:
- a first electrical contact terminal,
- a second electrical contact terminal, and
- a third electrical contact terminal, non-zero voltage being arranged to prevail between the second electrical contact terminal and the third electrical contact terminal, and the second electrical device comprises:
- a first counterpart for the first electrical contact terminal,
- a second counterpart for the second electrical contact terminal, and
- a third counterpart for the third electrical contact terminal, the first counterpart having a galvanic contact with the third counterpart.

The arrangement for detecting a situation in which the first electrical device is connected to the second electrical device comprises:
- a resistor that is connected between the first electrical contact terminal and the second electrical contact terminal,
- a detector that is arranged to detect the situation in which the first electrical device is connected to the second electrical device on the basis of a change of an electrical quantity associated with the resistor, and
- a control circuitry arranged to reduce power consumption of the first electrical device as a response to a situation in which the change of the electrical quantity associated with the resistor is indicative of a decrease of power dissipated in the resistor.

In accordance with a second aspect of the invention a novel method for detecting a situation in which a first electrical device is connected to a second electrical device is provided. The method comprises detecting the situation in which the first electrical device is connected to the second electrical device on the basis of a change of an electrical quantity associated with the resistor connected between the first electrical contact terminal and the second electrical contact terminal, and the method further comprises reducing the power consumption of the first electrical device as a response to a situation in which the change of the electrical quantity associated with the resistor is indicative of a decrease of power dissipated in the resistor.

When the first electronic device is connected to the second electronic device the following path for electrical current is formed: the second electrical contact terminal—the resistor—the first electrical contact terminal—the first counterpart—the galvanic contact between the first and third counterpart—the third counterpart—the third electrical contact terminal. The voltage between the second electrical contact terminal and the third electrical contact terminal generates electrical current via the above-mentioned path. Therefore, a situation in which the first electrical device is connected to the second electrical device, as well as a situation in which the first electrical device is disconnected from the second electrical device, can be detected on the basis of a change of an electrical quantity, e.g. electrical current, voltage, and/or electrical power, associated with the above-mentioned resistor.

The voltage between the second electrical contact terminal and the third electrical contact terminal can be selected to be so low that power losses in the first electrical device can be low in a state in which the first electrical device is not connected to the second electrical device. Therefore, undesirable waste of energy can be reduced compared with the prior art solution described earlier in this document.

The first electrical contact terminal can be, for example, a metal shield of an USB-connector (Universal Serial Bus), the second electrical contact terminal can be, for example, a contact strip of the USB-connector, and the third electrical contact terminal can be, for example, another contact strip of the USB-connector.

In accordance with a third aspect of the invention a novel electrical device capable of detecting a situation in which the electronic device is connected to another electronic device is provided. The electronic device comprises:

a first electrical contact terminal,
a second electrical contact terminal,
a third electrical contact terminal, non-zero voltage being arranged to prevail between the second electrical contact terminal and the third electrical contact terminal,
a resistor connected between the first electrical contact terminal and the second electrical contact terminal,
a detector arranged to detect a situation in which the electrical device is connected to another electrical device on the basis of a change of an electrical quantity associated with the resistor, and
a control circuitry arranged to reduce power consumption of the electronic device as a response to a situation in which the change of the electrical quantity associated with the resistor is indicative of a decrease of power dissipated in the resistor.

A number of embodiments of the invention are described in accompanied dependent claims.

Various embodiments of the invention both as to constructions and to methods of operation, together with additional objects and advantages thereof, will be best understood from the following description of specific embodiments when read in connection with the accompanying drawings.

The embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The embodiments of the invention are presented as examples and their advantages are explained in greater detail below with reference to the accompanying drawings, in which.

DESCRIPTION OF EMBODIMENTS OF THE INVENTION

Figure 1A:
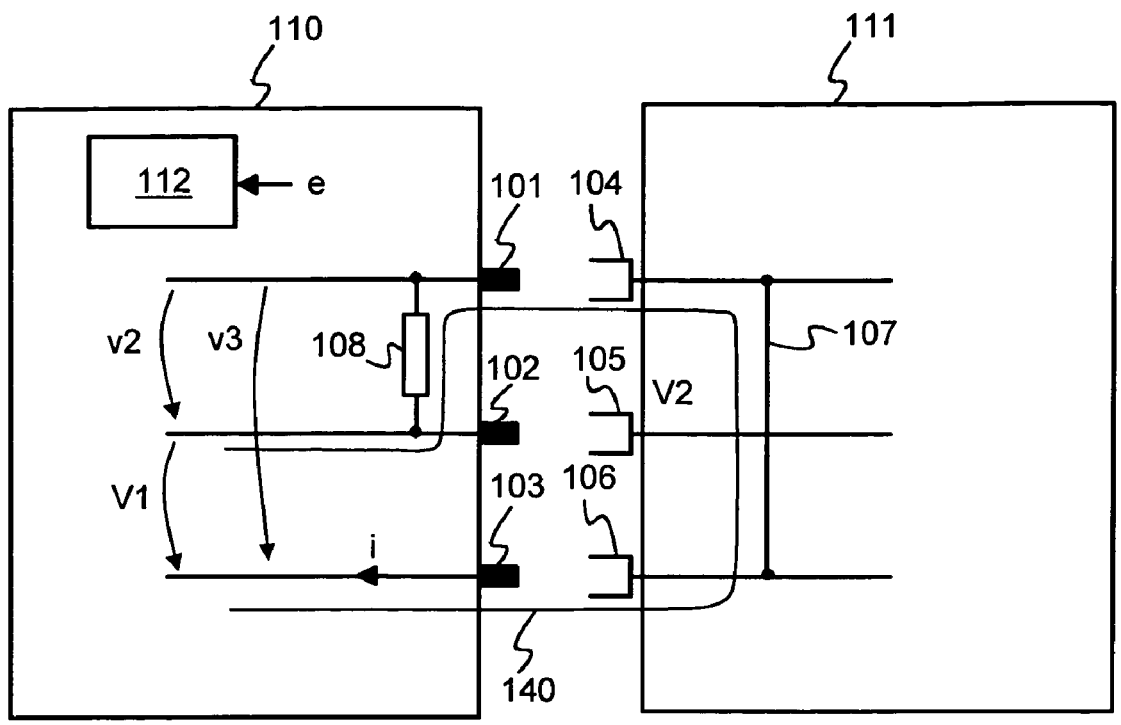
FIGS. 1a and 1b show arrangements according to embodiments of the invention for detecting a situation in which an electrical device is connected to another electrical device.

FIG. 1a shows an arrangement according to an embodiment of the invention for detecting a situation in which a first electrical device 110 is connected to a second electrical device 111. The electrical device 110 comprises a first electrical contact terminal 101, a second electrical contact terminal 102, and a third electrical contact terminal 103. The said electrical contact terminals can be, for example, electrical contact terminals, e.g. pins or contact strips, of an electrical connector. Non-zero voltage V1 is arranged to prevail between the electrical contact terminals 102 and 103. The electrical device 111 comprises a first counterpart 104 that is arranged to fit with the electrical contact terminal 101, a second counterpart 105 that is arranged to fit with the electrical contact terminal 102, and a third counterpart 106 that is arranged to fit with the electrical contact terminal 103. The electrical device 111 comprises a galvanic contact 107 between the counterpart 104 and the counterpart 106. The arrangement for detecting a situation in which the electrical device 110 is connected to the electrical device 111 comprises a resistor 108 that is connected between the electrical contact terminal 101 and the electrical contact terminal 102. The arrangement comprises a detector 112 that is arranged to detect the situation in which the electrical device 110 is connected to the electrical device 111 on the basis of a change of an electrical quantity e associated with the resistor 108. When the electrical device 110 is connected to the electrical device 111, i.e. the electrical contact terminals 101, 102, and 103 are connected to the counterparts 104, 105, and 106, respectively, a path 140 for electrical current is formed and a change in an electrical quantity associated with the resistor 108 takes place.

In an arrangement according to an embodiment of the invention the detector 112 is arranged to detect the situation in which the electrical device 110 is connected to the electrical device 111 on the basis of a change of electrical current i flowing via the electrical contact terminal 103. In this embodiment, the electrical current i represents the electrical quantity e associated with the resistor 108.

In an arrangement according to an embodiment of the invention the detector 112 is arranged to detect the situation in which the electrical device 110 is connected to the electrical device 111 on the basis of a change of voltage v2 between the electrical contact terminals 101 and 102. In this embodiment, the voltage v2 represents the electrical quantity e associated with the resistor 108.

In an arrangement according to an embodiment of the invention the detector 112 is arranged to detect the situation in which the electrical device 110 is connected to the electrical device 111 on the basis of a change of voltage v3 between the electrical contact terminals 101 and 103. In this embodiment, the voltage v3 represents the electrical quantity e associated with the resistor 108.

In an arrangement according to an embodiment of the invention the detector 112 is arranged to detect the situation in which the electrical device 110 is connected to the electrical device 111 on the basis of a change of electrical power $P=V1 \times i$ supplied by the electrical device 110 to the electrical contact terminals 102 and 103. In this embodiment, the electrical power $P=V1 \times i$ represents the electrical quantity e associated with the resistor 108.

Figure 1B:
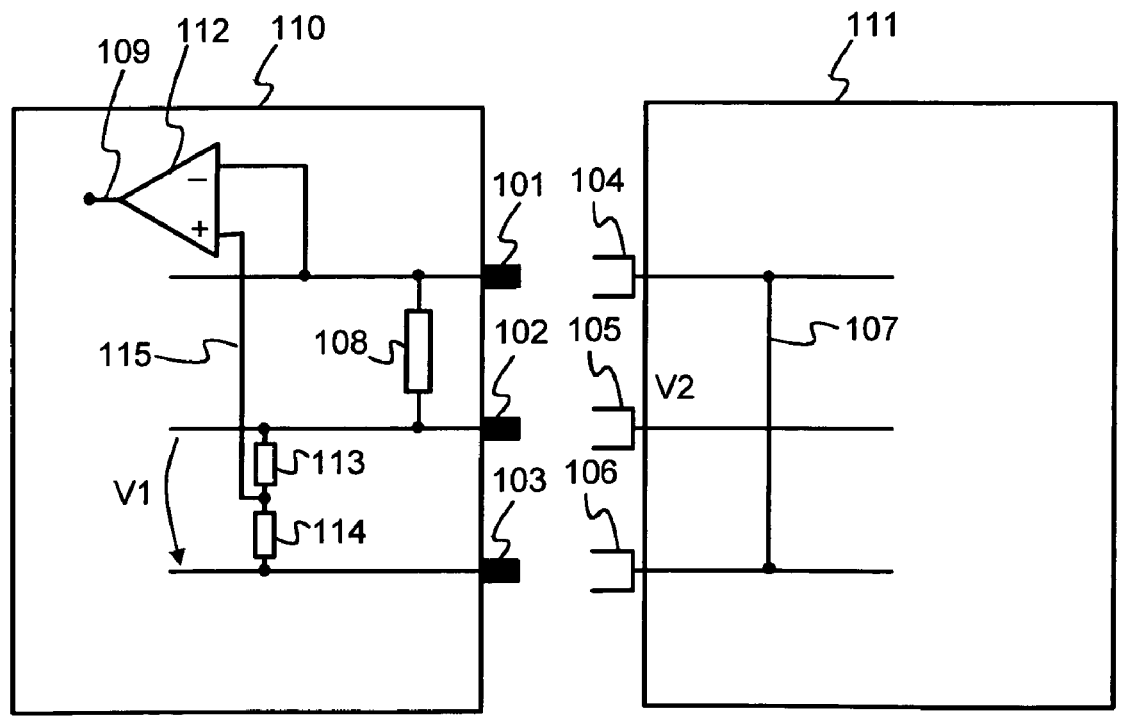

FIG. 1b shows an arrangement according to an embodiment of the invention in which a comparator 112 constitutes the detector that is arranged to detect the situation in which the electrical device 110 is connected to the electrical device 111. When the electrical device 110 is not connected to the electrical device 111, electrical potential of the electrical contact terminal 101 is the same as electrical potential of the electrical contact terminal 102, i.e. there is no electrical current, and thus no voltage loss, in the resistor 108. Electrical potential of a node 115 is lower than the electrical potential of the electrical contact terminal 102 but higher than electrical potential of the electrical contact terminal 103. Therefore, an output terminal 109 of the comparator 112 is at a low voltage. The electrical potential of the node 115 depends on values of voltage division resistors 113 and 114. When the electrical device 110 is connected to the electrical device 111, the electrical potential of the electrical contact terminal 101 is substantially the same as the electrical potential of the electrical contact terminal 103, i.e. the current path 140 is formed. Therefore, an output terminal 109 of the comparator 112 is at a high voltage. Thus, the comparator 112 is arranged to detect whether or not the electrical device 110 is connected to the electrical device 111.

Figure 2:
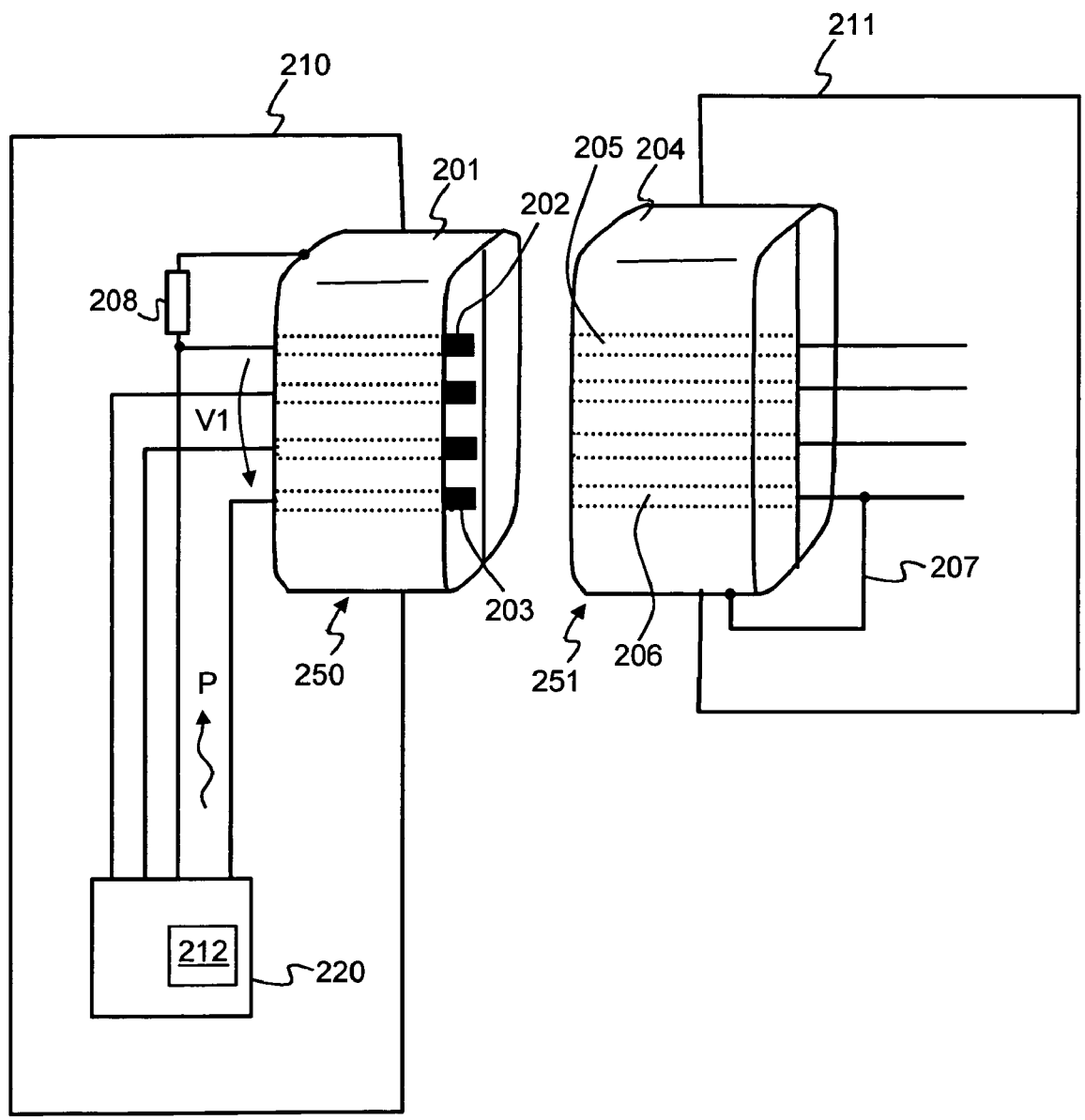
FIG. 2 shows an arrangement according to an embodiment of the invention for detecting a situation in which an electrical device is connected to another electrical device.

FIG. 2 shows an arrangement according to an embodiment of the invention for detecting a situation in which a first electrical device 210 is connected to a second electrical device 211. The electrical device 210 comprises a first electrical contact terminal 201, a second electrical contact terminal 202, and a third electrical contact terminal 203. The electrical contact terminal 201 is a metal shield of an USB-connector 250 (Universal Serial Bus), the electrical contact terminal 202 is a contact strip of the USB-connector, and the electrical contact terminal 203 is another contact strip of the USB-connector. Non-zero voltage V1 is arranged to prevail between the contact strips 202 and 203. The electrical device 211 comprises a counterpart 251 for the USB-connector. The counterpart 251 for the USB-connector comprises a metal shield 204 that is arranged to fit with the metal shield 201, a contact strip 205 that is arranged to fit with the contact strip 202, and a contact strip 206 that is arranged to fit with the contact strip 203. There is a galvanic contact 207 between the metal shield 204 and the contact strip 206.

The arrangement for detecting a situation in which the electrical device 210 is connected to the electrical device 211 comprises a resistor 208 that is connected between the metal shield 201 and the contact strip 202. The arrangement comprises a detector 212 that is arranged to detect the situation in which the electrical device 210 is connected to the electrical device 211 on the basis of a change of electrical power P supplied by circuitry 220 to the contact strips 202 and 203.

Figure 3:
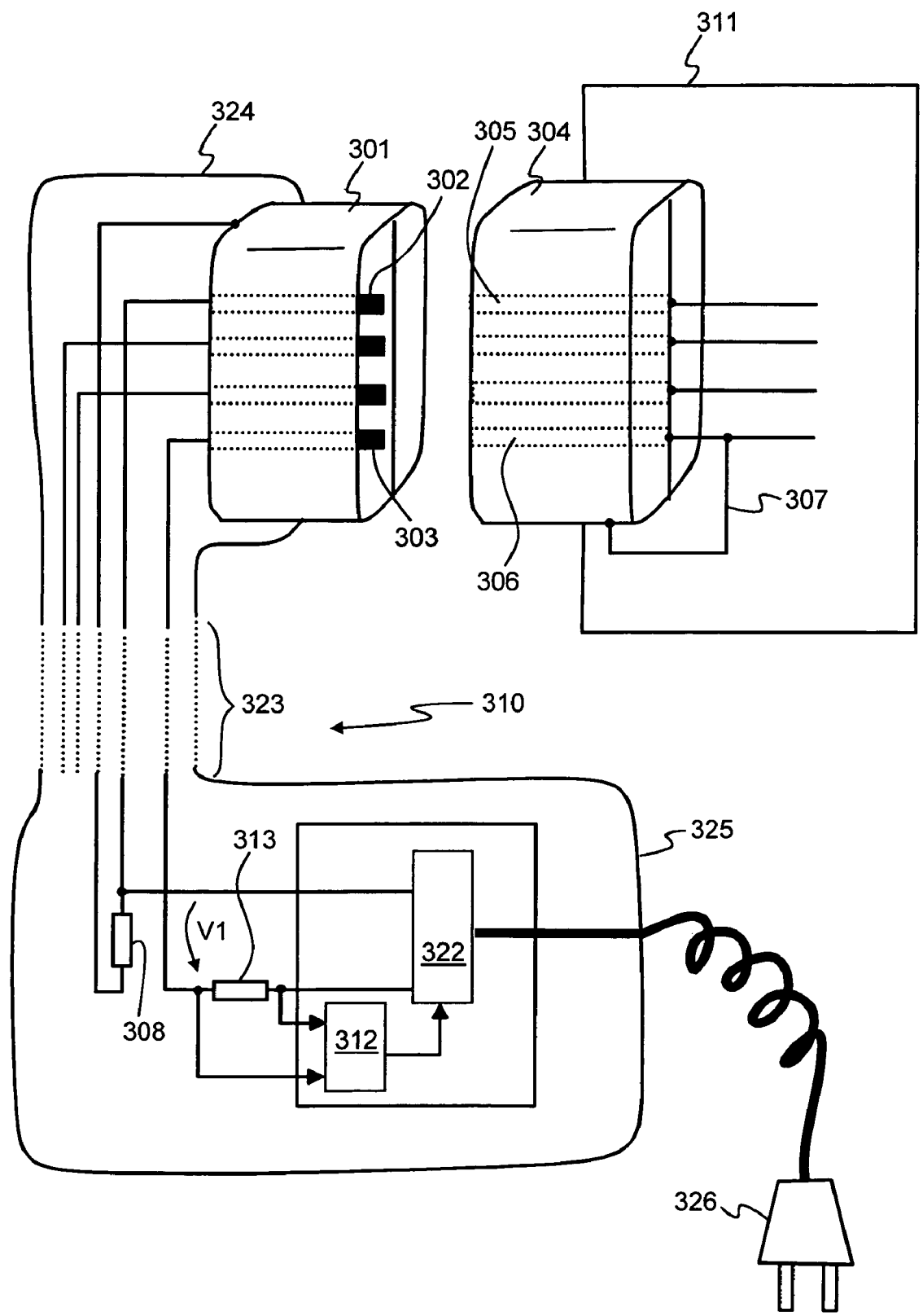
FIG. 3 shows an electrical device according to an embodiment of the invention.

FIG. 3 shows an electrical device 310 according to an embodiment of the invention. The electrical device comprises a first electrical contact terminal 301, a second electrical contact terminal 302, and a third electrical contact terminal 303. Non-zero voltage V1 is arranged to prevail between the electrical contact terminal 302 and the electrical contact terminal 303. The electrical device comprises a resistor 308 that is connected between the electrical contact terminal 301 and the electrical contact terminal 302. The electrical device comprises a detector 312 that is arranged to detect a situation in which the electrical device 310 is connected to another electrical device 311 on the basis of a change of an electrical quantity associated with the resistor 108. The detector 312 is arranged to detect the situation in which the electrical device is connected to the other electrical device on the basis of a change of electrical current flowing via the electrical contact terminal 303. The electrical current is indicated with the aid of a shunt resistor 313 and voltage across the shunt resistor is given as an input quantity to the detector 312. The electrical device 310 comprises a connector 324 that is coupled with a cable 323 to other parts 325 of the electrical device.

In an electrical device according to a first alternative embodiment of the invention the detector 312 is arranged to detect the situation in which the electrical device 310 is connected to the other electrical device 311 on the basis of a change of voltage between the electrical contact terminal 301 and the electrical contact terminal 303.

In an electrical device according to a second alternative embodiment of the invention the detector 312 is arranged to detect the situation in which the electrical device 310 is connected to the other electrical device 311 on the basis of a change of electrical power supplied by the electrical device to the electrical contact terminals 302 and 303.

An electrical device according to an embodiment of the invention comprises a control circuitry 322 that is arranged to perform a pre-determined control action as a response to a situation in which the change of the electrical quantity associated with the resistor is detected. The control circuitry 322 can be, for example, a programmable processor or a dedicated integrated circuit. It is also possible that the detector 312 is a part of the control circuitry 322.

In an electrical device according to an embodiment of the invention the control circuitry 322 is arranged to reduce power consumption of the electrical device 310 as a response to a situation in which the change of the electrical quantity associated with the resistor is indicative of a decrease of power dissipated in the resistor 308, i.e. the change of the electrical quantity indicates a situation in which the electrical device is disconnected from the other electrical device.

In an electrical device according to an embodiment of the invention the control circuitry 322 is arranged to activate a pre-determined operation of the electrical device 310 as a response to a situation in which the change of the electrical quantity associated with the resistor is indicative of an increase of power dissipated in the resistor 308, i.e. the change of the electrical quantity indicates a situation in which the electrical device is connected to the other electrical device.

An electrical device according to an embodiment of the invention is a charger device capable of supplying electrical power to the other electrical device 311. The other electrical device 311 can be, for example, a mobile phone or a palmtop computer.

In an electrical device according to an embodiment of the invention the electrical contact terminal 301 is a metal shield of an USB-connector (Universal Serial Bus), the electrical contact terminal 302 is a contact strip of the USB-connector, and the electrical contact terminal 303 is another contact strip of the USB-connector.

In an electrical device according to an embodiment of the invention the control circuitry 322 is arranged to reduce the voltage between the electrical contact terminal 302 and the electrical contact terminal 303 to a first pre-determined non-zero value as response to a situation in which the change of the electrical quantity associated with the resistor 308 is indicative of a decrease of a power dissipated in the resistor, i.e. the change of the electrical quantity indicates a situation in which the electrical device is disconnected from the other electrical device 311. The above-described functionality is advantageous, for example, in a charger device because undesirable energy loss can be reduced in a situation in which the charger device is energized but not connected to the other electrical device 311.

In an electrical device according to an embodiment of the invention the control circuitry 322 is arranged to increase the voltage between the electrical contact terminal 302 and the electrical contact terminal 302 to a second pre-determined non-zero value as response to a situation in which the change of the electrical quantity associated with the resistor 308 is indicative of an increase of a power dissipated in the resistor, i.e. the change of the electrical quantity indicates a situation in which the electrical device is connected to the other electrical device 311.

Figure 4:
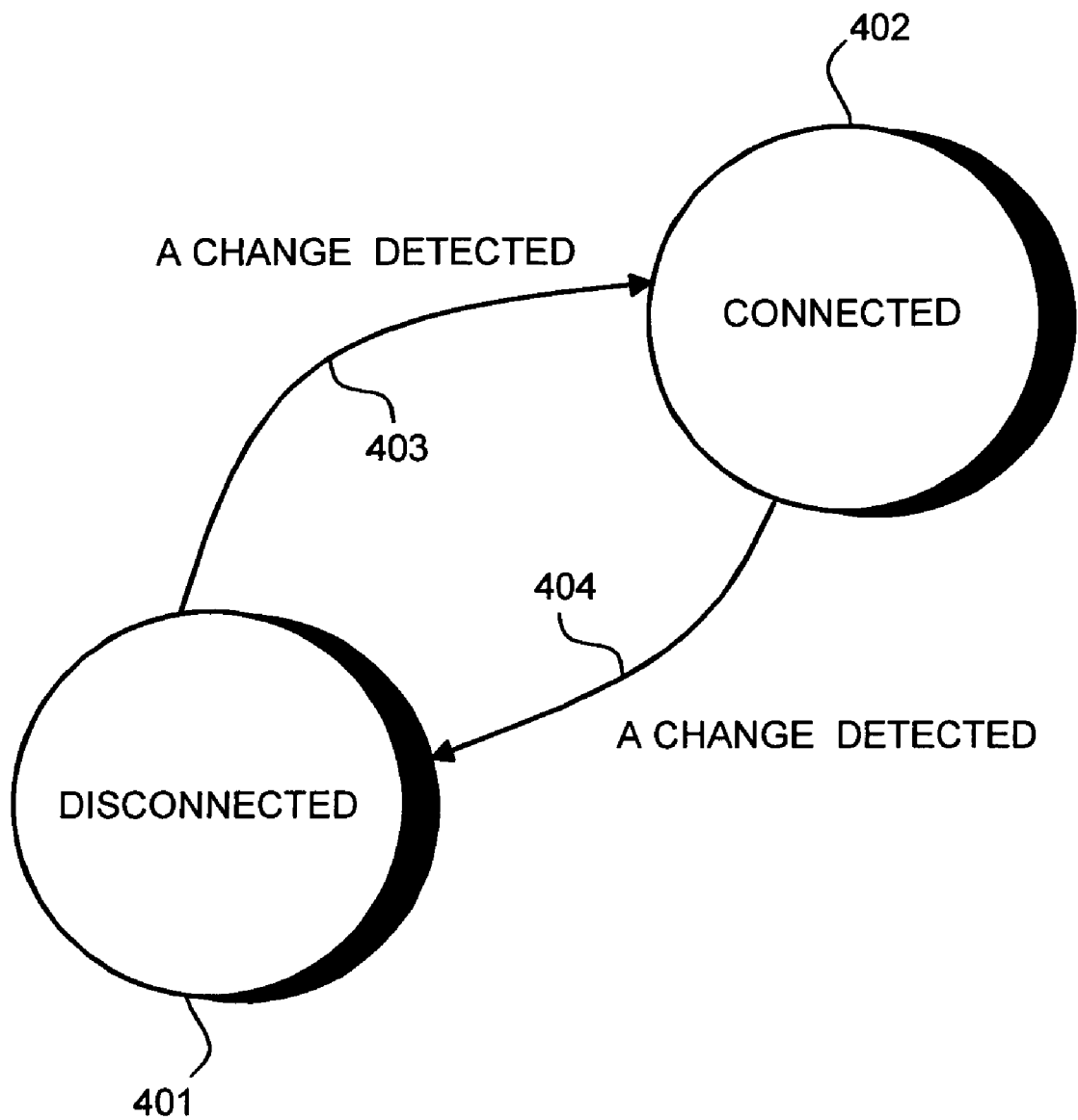
FIG. 4 shows a state diagram of a method according to an embodiment of the invention for detecting a situation in which an electrical device is connected to another electrical device.

FIG. 4 shows a state diagram of a method according to an embodiment of the invention for detecting a situation in which a first electrical device is connected to a second electrical device. The first electrical device 110 (numbers greater than 100 and less than 200 refer to FIG. 1a) comprises:

a first electrical contact terminal 101,
a second electrical contact terminal 102, and
a third electrical contact terminal 103, non-zero voltage V1 being arranged to prevail between the second electrical contact terminal and the third electrical contact terminal.

The second electrical device 111 comprises:
a first counterpart 104 for the first electrical contact terminal,
a second counterpart 105 for the second electrical contact terminal, and
a third counterpart 106 for the third electrical contact terminal, the first counterpart having a galvanic contact 107 with the third counterpart.

The situation in which the first electrical device is connected to the second electrical device is detected on the basis of a change of an electrical quantity associated with a resistor 108 connected between the first electrical contact terminal and the second electrical contact terminal. When the first electrical device is connected to the second electrical device, i.e. a transition from a state 401 to a state 402 takes place, the following path for electrical current is formed: the second electrical contact terminal 102—the resistor 108—the first electrical contact terminal 101—the first counterpart 104—the galvanic contact 107 between the first and third counterpart—the third counterpart 106—the third electrical contact terminal 103. As a consequence, a change in an electrical quantity associated with the resistor 108 can be detected 403. When the first electrical device is disconnected from the second electrical device, i.e. a transition from the state 402 to the state 401 takes place, the above-described path for the electrical current is broken. As a consequence, a change in an electrical quantity associated with the resistor 108 can be detected 404.

In a method according to an embodiment of the invention the first electrical contact terminal is a metal shield of an USB-connector (Universal Serial Bus), the second electrical contact terminal is a contact strip of the USB-connector, and the third electrical contact terminal is another contact strip of the USB-connector.

In a method according to an embodiment of the invention the situation in which the first electrical device is connected to the second electrical device is detected on the basis of a change of electrical current flowing via the third electrical contact terminal.

In a method according to an embodiment of the invention the situation in which the first electrical device is connected to the second electrical device is detected on the basis of a change of voltage between the first electrical contact terminal and the third electrical contact terminal.

In a method according to an embodiment of the invention the situation in which the first electrical device is connected to the second electrical device is detected on the basis of a change of electrical power supplied by the first electrical device to the first electrical contact terminal and the second electrical contact terminal While there have been shown and described and pointed out fundamental novel features of the invention as applied to embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above, many variants being possible without departing from the scope of the inventive idea.

What is claimed is:

1. An electrical device, comprising:
a first electrical contact terminal,
a second electrical contact terminal,
a third electrical contact terminal, non-zero voltage being arranged to prevail between the second electrical contact terminal and the third electrical contact terminal,
a resistor connected between the first electrical contact terminal and the second electrical contact terminal,
a detector arranged to detect a situation in which the electrical device is connected to another electrical device on the basis of a change of an electrical quantity associated with the resistor, and
a control circuitry arranged to reduce power consumption of the electrical device as a response to a situation in which the change of the electrical quantity associated with the resistor is indicative of a decrease of power dissipated in the resistor.

2. An electrical device according to claim 1, wherein the detector is arranged to detect the situation in which the electrical device is connected to the other electrical device on the basis of a change of electrical current flowing via the third electrical contact terminal.

3. An electrical device according to claim 1, wherein the detector is arranged to detect the situation in which the electrical device is connected to the other electrical device on the basis of a change of voltage between the first electrical contact terminal and the third electrical contact terminal.

4. An electrical device according to claim 1, wherein the detector is arranged to detect the situation in which the electrical device is connected to the other electrical device on the basis of a change of electrical power supplied by the electrical device to the first electrical contact terminal and the second electrical contact terminal.

5. An electrical device according to claim 1, wherein the control circuitry is arranged to activate a pre-determined operation of the electrical device as a response to a situation in which the change of the electrical quantity associated with the resistor is indicative of an increase of power dissipated in the resistor.

6. An electrical device according to claim 1, wherein the electrical device is a charger device capable of supplying electrical power to the other electrical device.

7. An electrical device according to claim 1, wherein the first electrical contact terminal is a metal shield of an USB-connector (Universal Serial Bus), the second electrical contact terminal is a contact strip of the USB-connector, and the third electrical contact terminal is another contact strip of the USB-connector.

8. An electrical device according to claim 6, wherein the control circuitry is arranged to reduce the voltage between the second electrical contact terminal and the third electrical contact terminal to a first pre-determined non-zero value in response to a situation in which the change of the electrical quantity associated with the resistor is indicative of a decrease of a power dissipated in the resistor.

9. An electrical device according to claim 6, wherein the control circuitry is arranged to increase the voltage between the second electrical contact terminal and the third electrical contact terminal to a second pre-determined non-zero value in response to a situation in which the change of the electrical quantity associated with the resistor is indicative of an increase of a power dissipated in the resistor.

10. An arrangement for detecting a situation in which a first electrical device is connected to a second electrical device comprising:
   a resistor connected between a first electrical contact terminal of the first electrical device and a second electrical contact terminal of the first electrical device, the first electrical device further having a first electrical contact terminal, a second electrical contact terminal, and a third electrical contact terminal, non-zero voltage being arranged to prevail between the second electrical contact terminal and the third electrical contact terminal,
   a detector arranged to detect the situation in which the first electrical device is connected to the second electrical device on the basis of a change of an electrical quantity associated with the resistor, the second electrical device having a first counterpart for the first electrical contact terminal, a second counterpart for the second electrical contact terminal, and a third counterpart for the third electrical contact terminal, the first counterpart having a galvanic contact with the third counterpart, and
   a control circuitry arranged to reduce power consumption of the first electrical device as a response to a situation in which the change of the electrical quantity associated with the resistor is indicative of a decrease of power dissipated in the resistor.

11. An arrangement according to claim 10, wherein the first electrical contact terminal is a metal shield of an USB-connector (Universal Serial Bus), the second electrical contact terminal is a contact strip of the USB-connector, and the third electrical contact terminal is another contact strip of the USB-connector.

12. An arrangement according to claim 10, wherein the detector is arranged to detect the situation in which the first electrical device is connected to the second electrical device on the basis of a change of electrical current flowing via the third electrical contact terminal.

13. An arrangement according to claim 10, wherein the detector is arranged to detect the situation in which the first electrical device is connected to the second electrical device on the basis of a change of voltage between the first electrical contact terminal and the third electrical contact terminal.

14. An arrangement according to claim 10, wherein the detector is arranged to detect the situation in which the first electrical device is connected to the second electrical device on the basis of a change of electrical power supplied by the first electrical device to the first electrical contact terminal and the second electrical contact terminal.

15. A method for detecting a situation in which a first electrical device is connected to a second electrical device comprising:
   detecting the situation in which the first electrical device having a first electrical contact terminal, a second electrical contact terminal, and a third electrical contact terminal, non-zero voltage being arranged to prevail between the second electrical contact terminal and the third electrical contact terminal, is connected to the second electrical device having a first counterpart for the first electrical contact terminal, a second counterpart for the second electrical contact terminal, and a third counterpart for the third electrical contact terminal, the first counterpart having a galvanic contact with the third counterpart, the detecting on the basis of a change of an electrical quantity associated with a resistor connected between the first electrical contact terminal and the second electrical contact terminal, and
   reducing power consumption of the first electrical device as a response to a situation in which the change of the electrical quantity associated with the resistor is indicative of a decrease of power dissipated in the resistor.

16. A method according to claim 15, wherein the first electrical contact terminal is a metal shield of an USB-connector (Universal Serial Bus), the second electrical contact terminal is a contact strip of the USB-connector, and the third electrical contact terminal is another contact strip of the USB-connector.

17. A method according to claim 15, wherein the situation in which the first electrical device is connected to the second electrical device is detected on the basis of a change of electrical current flowing via the third electrical contact terminal.

18. A method according to claim 15, wherein the situation in which the first electrical device is connected to the second electrical device is detected on the basis of a change of voltage between the first electrical contact terminal and the third electrical contact terminal.

19. A method according to claim 15, wherein the situation in which the first electrical device is connected to the second electrical device is detected on the basis of a change of electrical power supplied by the first electrical device to the first electrical contact terminal and the second electrical contact terminal.

* * * * *